United States Patent
Park et al.

(10) Patent No.: US 8,107,759 B2
(45) Date of Patent: Jan. 31, 2012

(54) METHOD OF DETECTING LOW LUMINANCE NOISE AND IMAGE COMPRESSION APPARATUS USING THE SAME

(75) Inventors: Jeong-Rok Park, Hwaseong-si (KR); Yong-Hyun Lim, Suwon-si (KR); Kyung-Ho Chae, Seoul (KR); Yun-Je Oh, Yongin-si (KR)

(73) Assignee: Samsung Electronics Co., Ltd., Maetan-Dong, Yeongtong-Gu, Suwon-Si, Gyeonggi-Do (KR)

( * ) Notice: Subject to any disclaimer, the term of this patent is extended or adjusted under 35 U.S.C. 154(b) by 1135 days.

(21) Appl. No.: 11/975,828

(22) Filed: Oct. 22, 2007

(65) Prior Publication Data
US 2008/0095460 A1    Apr. 24, 2008

(30) Foreign Application Priority Data
Oct. 20, 2006    (KR) .................. 10-2006-0102596

(51) Int. Cl.
*G06K 9/38*      (2006.01)
*G06K 9/40*      (2006.01)

(52) U.S. Cl. ........................ 382/262; 382/275
(58) Field of Classification Search .......... 382/199, 382/254, 262, 266, 232; 348/616
See application file for complete search history.

(56) References Cited

U.S. PATENT DOCUMENTS

| | | | |
|---|---|---|---|
| 7,065,255 B2 * | 6/2006 | Chen et al. | 382/260 |
| 7,734,115 B2 * | 6/2010 | Kang et al. | 382/275 |
| 7,804,533 B2 * | 9/2010 | Oshima | 348/246 |

FOREIGN PATENT DOCUMENTS

| | | |
|---|---|---|
| KR | 2005-103773 | 11/2005 |
| KR | 2005-117173 | 12/2005 |

OTHER PUBLICATIONS

Lee, K.-C., Jong, H. and Sohn, K.-H., Detection-estimation based approach for impulsive noise removal. Electron. Lett. v34. 449-450, 1998.*
Seong-Won Lee; Vivek Maik; Jihoon Jang; Jeongho Shin; Joonki Paik; , "Noise-adaptive spatio-temporal filter for real-time noise removal in low light level images," Consumer Electronics, IEEE Transactions on , vol. 51, No. 2, pp. 648- 653, May 2005.*

* cited by examiner

*Primary Examiner* — Andrae S Allison
(74) *Attorney, Agent, or Firm* — Cha & Reiter, LLC

(57) ABSTRACT

In a photograph and image compression system equipped with a camera, a low luminance noise cancellation algorithm is selectively applied to photographs and video images including a low luminance noise, by determining whether the low luminance noise is included in a portion of an input image, and if it is determined that low luminance noise is included, the low luminance noise cancellation algorithm is executed on the input image.

13 Claims, 6 Drawing Sheets

METHOD OF DETECTING LOW LUMINANCE NOISE AND IMAGE COMPRESSION APPARATUS USING THE SAME

CLAIM OF PRIORITY

This application claims the benefit under 35 U.S.C. §119 (a) of a patent application filed in the Korean Intellectual Property Office on Oct. 20, 2006 and assigned Serial No. 2006-102596, the contents of which are incorporated herein by reference.

BACKGROUND OF THE INVENTION

1. Field of the Invention

The present invention relates generally to an image compression apparatus and a method of compressing the image.

2. Description of the Related Art

As low luminance noise is typically included in a photograph or video image captured in a low luminance environment, compression efficiency and image quality suffer even when the photograph or video image are compressed.

A system in which a low luminance noise cancellation algorithm is implemented, e.g. an image compression system equipped with a camera, has been suggested to cancel the low luminance noise before a photograph or video image is compressed. To this end, a camera image sensor has a function of selectively detecting a low luminance pixel.

FIG. 1 is a block diagram of a conventional image compression apparatus having a low luminance noise cancellation function. Referring to FIG. 1, the conventional image compression apparatus includes an image capturer 10 for capturing an input image, a low luminance noise canceller 20 for canceling low luminance noise from the input image, and an image compressor 30 for compressing a low luminance noise cancelled image. Since an image output from the image capturer 10 is input to the low luminance noise canceller 20, every image is input to the low luminance noise canceller 20. As a result, a low luminance noise cancellation process is performed for every image. As described above, conventionally, the low luminance noise cancellation process is performed for every image in the image compression apparatus.

However, the low luminance noise cancellation algorithm requires a great amount of computation and is difficult to be applied to all photographs and video images in real-time. In addition, low luminance noise significantly affects the image quality as the number of pixels of a camera increases. Further, the low luminance noise cancellation algorithm is difficult to be applied to a low-performance processor employed in a cellular phone, and may be a reason of excessive power consumption.

SUMMARY OF THE INVENTION

An aspect of the present invention is to substantially solve at least the above problems and/or disadvantages and to provide at least the advantages below. Accordingly, an aspect of the present invention is to provide a method and apparatus for determining whether low luminance noise exists in an input image.

According to one aspect of the present invention, an image compression apparatus for detecting low luminance noise includes: a median value calculator for calculating a median value using a median filter with respect to pixels in a partial area of an input image when an image is input; a low luminance noise determiner for determining whether a difference between the median value and each original pixel value of the partial area exceeds a low luminance noise determination threshold, counting the number of pixels exceeding the low luminance noise determination threshold, and determining based on a degree of dispersion of low luminance noise whether the input image includes low luminance noise; and a low luminance noise canceller for executing a low luminance noise cancellation algorithm for the input image only if the input image includes low luminance noise.

BRIEF DESCRIPTION OF THE DRAWINGS

The above features and advantages of the present invention will become more apparent from the following detailed description when taken in conjunction with the accompanying drawing in which.

DETAILED DESCRIPTION OF THE INVENTION

Figure 1:
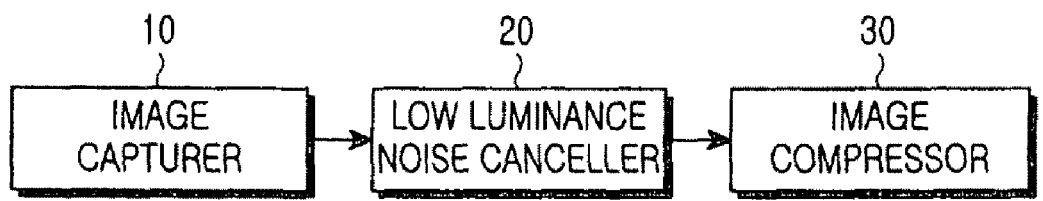
FIG. 1 is a block diagram of a conventional image compression apparatus having a low luminance noise cancellation function.

Now, embodiments of the present invention will be described herein below with reference to the accompanying drawings. In the drawings, the same or similar elements are denoted by the same reference numerals even though they are depicted in different drawings. For the purposes of clarity and simplicity, well-known functions or constructions are not described in detail as they would obscure the invention in unnecessary detail.

According to the teachings of the present invention, a low luminance noise cancellation algorithm is selectively applied to only photographs and video images including low luminance noise among photographs and video images input to a photograph and image compression system equipped with a camera. To achieve this, the present invention determines whether only a portion of an input image includes low luminance noise, and executes the low luminance noise cancellation algorithm for the input image only if it is determined that low luminance noise is included. Components and their operations of an image compression apparatus in which the above-described function is implemented will now be described with reference to FIG. 2.

Figure 2:
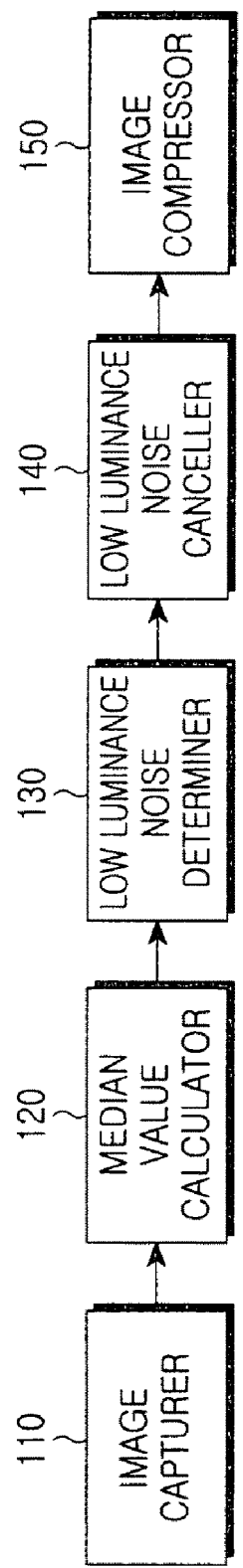
FIG. 2 is a block diagram of an image compression apparatus according to an exemplary embodiment of the present invention.

FIG. 2 is a block diagram of an image compression apparatus according to an exemplary embodiment of the present invention. Referring to FIG. 2, the image compression apparatus includes an image capturer 110, a median value calculator 120, a low luminance noise determiner 130, a low luminance noise canceller 140, and an image compressor 150.

In operation, the image capturer 110 captures a still image or an image of a moving picture using an image sensor, such as a camera, and provides the input image to the median value calculator 120.

The median value calculator 120 calculates a median value of a portion of the input image using a median filter. As understood by those skilled in the art, the median filter sequentially considers each pixel of an image, examines neighboring pixels in order to determine whether a considered pixel is a representative pixel of the neighboring pixels, and replaces a pixel value with a median value of neighboring pixel values instead of a mean value of the neighboring pixel values. In the current embodiment, a median value of a portion of the input image can be obtained using the median filter.

Figure 3:
FIG. 3 illustrates an image in which low luminance noise is represented.

When an image of an object is captured, a low luminance environment affects the entire captured image. Thus, when a low luminance noise is generated, the low luminance noise is represented over the entire image. FIG. 3 illustrates an image in which the low luminance noise is represented. As illustrated in FIG. 3, the low luminance noise has a characteristic that it is represented as a white noise pattern. That is, in order to know whether the low luminance noise exists in the entire image, even if the low luminance noise is detected from only a portion of the entire image, it can be determined whether the low luminance noise exists in the entire image. Thus, in the current embodiment, by determining whether the low luminance noise exists in a portion of an input image, it can be determined whether the low luminance noise exists in the entire image. For example, by determining whether the low luminance noise exists in only 1/16 or 1/32 of the entire image, for an example, it can be determined whether the low luminance noise exists in the entire image.

Figure 4:
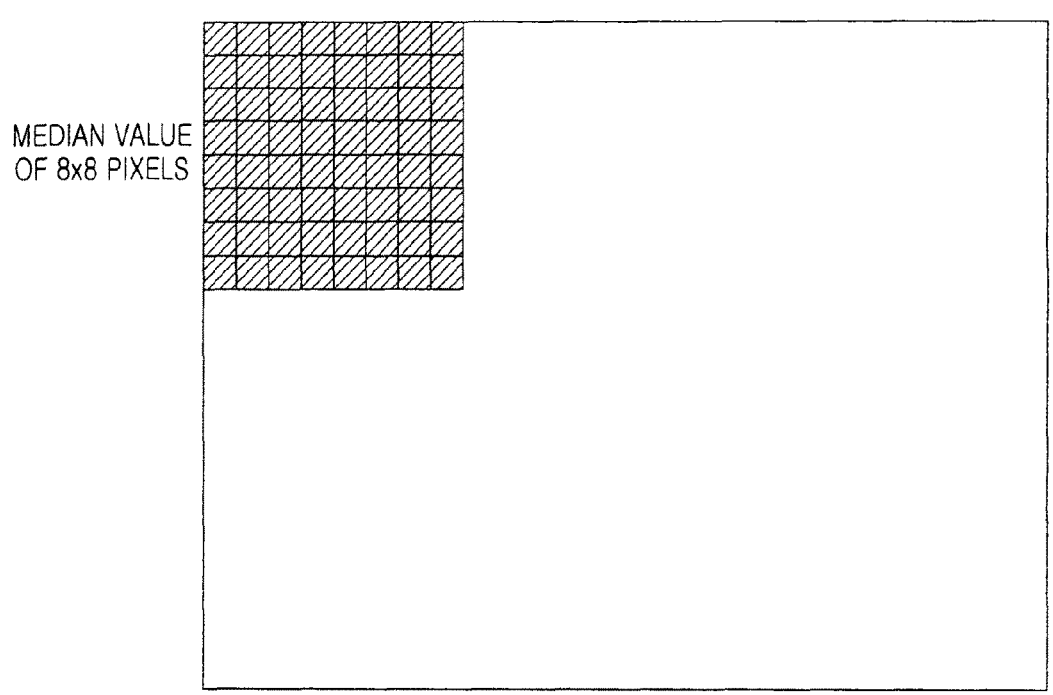
FIG. 4 illustrates a case where a median value is calculated for a portion of an image.

FIG. 4 illustrates a case where a median value is calculated for a portion of an image. As illustrated in FIG. 4, a median value of 64 pixels of an 8×8-block corresponding to 1/16 or 1/32 of an image including a low luminance noise is obtained using a median filter. Since a median value is obtained from pixels in a predetermined area, the median value is insensitive to a minimum or maximum value of neighboring pixels.

The median value is provided to the low luminance noise determiner 130. The low luminance noise determiner 130 calculates a difference between the median value and an original value of each pixel in a partial area of the input image from which the median value was determined. In FIG. 4, differences between the median value and the 64 pixels are obtained. As the difference is great, a value greater than neighboring pixel values exists, and it can be determined based on the number of pixels having a greater difference and a range of the pixels that the low luminance noise exists. That is, a pixel value of a white dot generated due to the low luminance noise will show a big difference from the median value. If each difference exceeds a low luminance noise determination threshold, it can be determined that a pixel having the difference was affected by noise.

Thus, the low luminance noise determiner 130 determines whether a difference between the median value and each original pixel value exceeds the low luminance noise determination threshold and counts the number of pixels exceeding the low luminance noise determination threshold. This can be represented by Formula 1.

$$\text{Number of pixels}(ABS(\text{image}-\text{median}(\text{image})) > \text{threshold}) \quad (1)$$

Figure 5A:
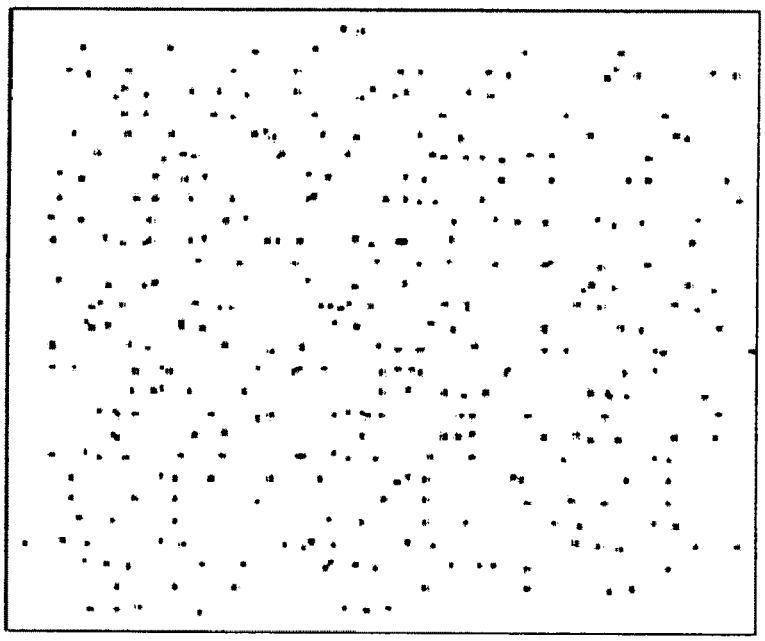
FIG. 5A illustrates an image including low luminance noise.
Figure 5B:
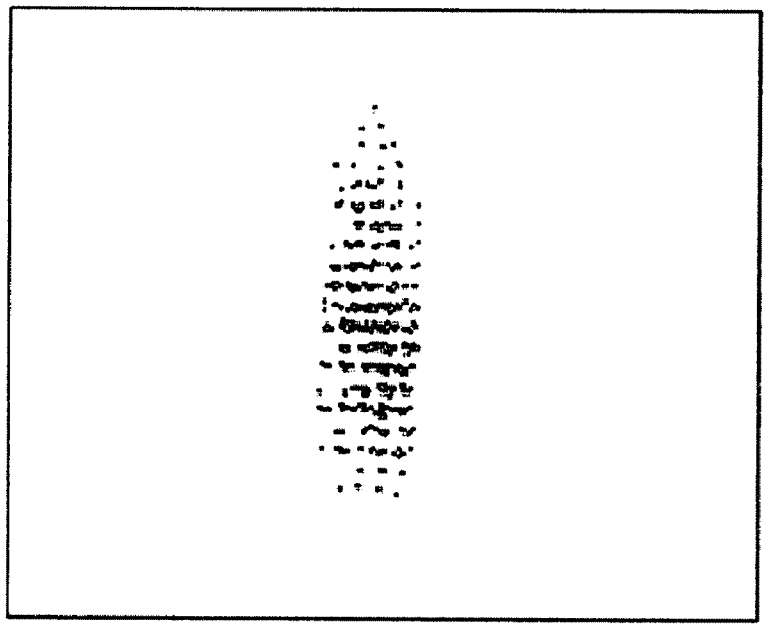
FIG. 5B illustrates an image in which low luminance noise is not included.

When the number of pixels exceeding the low luminance noise determination threshold is calculated using Formula 1, the low luminance noise determiner 130 calculates a degree of dispersion of the pixels. Since a non-noise pixel may be recognized as noise, it must be determined whether noise is distributed over the entire image. FIG. 5A illustrates an image including the low luminance noise, and FIG. 5B illustrates an image in which the low luminance noise is not included. Although the images in FIGS. 5A and 5B have the same number of pixels exceeding the low luminance noise determination threshold, the image in FIG. 5B is not an image including the low luminance noise.

Thus, in order to simply obtain the degree of dispersion of the number of pixels exceeding the low luminance noise determination threshold, the low luminance noise determiner 130 can obtain the degree of dispersion by calculating the median value based on the positions of all pixels of the partial image, calculating a distance between a pixel having the median value and each pixel having a value exceeding the low luminance noise determination threshold, averaging the distances, and comparing the mean distance and a predetermined value.

In more detail, the low luminance noise determiner 130 can obtain a median pixel based on the positions of all pixels of the partial image by obtaining a vector median value of all pixels of the partial image. The low luminance noise determiner 130 calculates a distance between the median pixel and each pixel having a value exceeding the low luminance noise determination threshold and calculates a mean value of the distances. As illustrated in FIG. 5B, if pixels having a value exceeding the low luminance noise determination threshold are gathered in a partial area, a mean value of distance differences with a median pixel is less than that of a case where the pixels having a value exceeding the low luminance noise determination threshold are spread over the entire image. That is, a mean value of distance differences is proportional to the size of the entire image, and can be represented by Formula 2.

$$\text{Degree of dispersion} = AVG(\text{pixel position}-\text{median pixel position})/\text{total image length} \quad (2)$$

As described above, if the mean value of distance differences is greater than a predetermined value, the low luminance noise determiner 130 can determine that the input image includes the low luminance noise. The low luminance noise determiner 130 provides a result of the determination to the low luminance noise canceller 140.

The low luminance noise canceller 140 cancels low luminance noise from an image having the low luminance noise. If the input image does not include low luminance noise, the low luminance noise canceller 140 outputs the input image to the image compressor 150 without canceling the low luminance noise from the input image.

Figure 6:
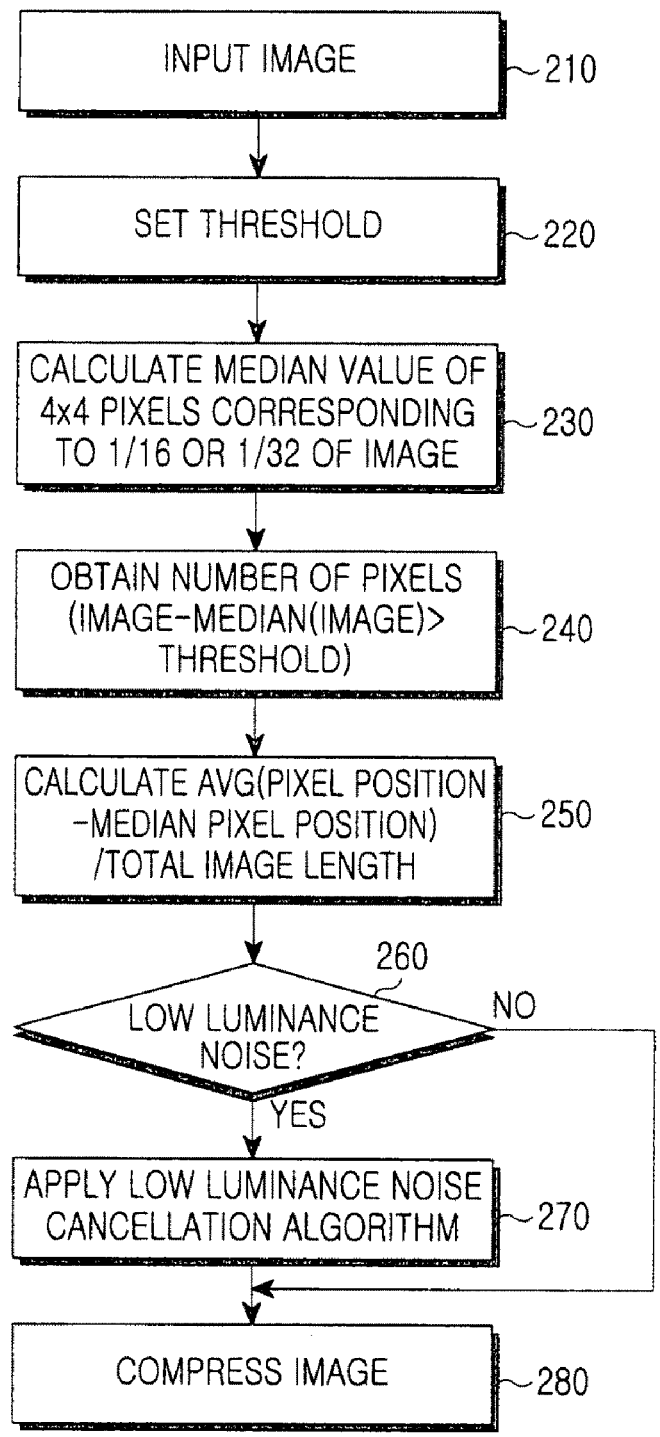
FIG. 6 is a flowchart illustrating a method of detecting the low luminance noise in an image compression apparatus according to an exemplary embodiment of the present invention.

FIG. 6 is a flowchart illustrating a method of detecting low luminance noise in an image compression apparatus according to an exemplary embodiment of the present invention.

Referring to FIG. 6, the image compression apparatus captures a predetermined image in step 210. The image compression apparatus determines a low luminance noise determination threshold in step 220. The low luminance noise determination threshold may be experimentally determined.

After determining the low luminance noise determination threshold, image compression apparatus determines a median value of a partial area of the input image in step 230. Although a median value of 16 pixels of a 4×4-block corresponding to 1/16 or 1/32 of the input image is used in the current embodiment, the median value is not limited thereto. The image compression apparatus determines in step 240 whether a difference between the median value and each original pixel value exceeds the low luminance noise determination threshold, and counts the number of pixels exceeding the low luminance noise determination threshold. Thereafter, the low luminance noise determiner 130 calculates a median value based on positions of all pixels of the partial image. The image compression apparatus calculates a distance between a pixel having the median value and each pixel having a value exceeding the low luminance noise determination threshold and calculates a mean value of the distances in step 250.

The image compression apparatus examines a degree of dispersion by comparing the mean value of the distances and a predetermined value in step 260. That is, the image compression apparatus determines in step 260 whether the input image includes the low luminance noise. If it is determined in step 260 that the input image includes the low luminance noise, the low luminance noise is cancelled by executing a low luminance noise cancellation algorithm for the input image in step 270. If it is determined in step 260 that the input image does not include the low luminance noise, the image compression apparatus compresses the input image in step 280 without executing the low luminance noise cancellation algorithm for the input image.

As described above, according to the present invention, by selectively applying a low luminance noise cancellation algorithm in an image compression apparatus instead of executing the low luminance noise cancellation algorithm for all input images, a method of detecting a low luminance noise can be applied to even a low-performance processor, and power consumption can be reduced, and thus, images having high image quality can be captured with expanding a using time of a cellular phone.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An apparatus for detecting a low luminance noise, comprising:
   a median value calculator for calculating a median value using a median filter with respect to pixels in a partial area of an input image;
   a low luminance noise determiner for determining whether a difference between the median value calculated by the median value calculator and each original pixel value of the partial area exceeds a predetermined threshold, counting the number of pixels exceeding the predetermined threshold, and determining based on a degree of dispersion of the low luminance noise whether the input image includes the low luminance noise only for the partial area of the input image; and
   a low luminance noise canceller for executing a low luminance noise cancellation algorithm for the input image only if the input image includes low luminance noise.

2. The apparatus of claim 1, wherein the low luminance noise determiner calculates the median value based on positions of all pixels of the input image, calculates a distance between a pixel having the median value and each pixel having a value exceeding the predetermined threshold, and calculates the degree of dispersion using a mean value of the distances.

3. The apparatus of claim 1, wherein the median value calculator calculates a median value of pixels corresponding to $1/16$ of the input image.

4. The apparatus of claim 1, wherein the median value calculator calculates a median value of pixels corresponding to $1/32$ of the input image.

5. The apparatus of claim 1, wherein the median value calculator calculates a median value of pixels corresponding to a predetermined portion of the input image.

6. The apparatus of claim 1, wherein a size of the partial area corresponds to $1/4$ or less of the input image.

7. A method of detecting a low luminance noise, comprising:
   calculating a median value using a median filter with respect to pixels in a partial area of an input image;
   determining whether a difference between the median value calculated using the median filter and each original pixel value of the partial area exceeds a predetermined threshold and counting the number of pixels exceeding the predetermined threshold;
   determining based on a degree of dispersion of low luminance noise only for the partial area of the input image whether the input image includes the low luminance noise; and
   executing a low luminance noise cancellation algorithm on the input image only if the input image includes the low luminance noise.

8. The method of claim 7, wherein the determining whether the input image includes the low luminance noise comprises calculating a median value based on positions of all pixels of the input image, calculating a distance between a pixel having the median value and each pixel having a value exceeding the predetermined threshold, and calculating the degree of dispersion using a mean value of the distances.

9. The method of claim 7, wherein the partial area of the input image corresponds to $1/16$ of the input image.

10. The method of claim 7, wherein the partial area of the input image corresponds to $1/32$ of the input image.

11. The method of claim 7, wherein the partial area of the input image correspond to a predetermined portion of the input image.

12. The method of claim 7, further comprising compressing the input image without the low luminance noise cancellation algorithm if the input image does not include the low luminance noise.

13. The method of claim 7, wherein a size of the partial area corresponds to $1/4$ or less of the input image.

* * * * *